(12) United States Patent
DeVries et al.

(10) Patent No.: US 11,504,918 B2
(45) Date of Patent: Nov. 22, 2022

(54) CROSS-LINKED PEX FORMING AFTER ASSEMBLY

(71) Applicant: Delta Faucet Company, Indianapolis, IN (US)

(72) Inventors: Adam M. DeVries, Anderson, IN (US); Kurt Judson Thomas, Indianapolis, IN (US)

(73) Assignee: Delta Faucet Company, Indianapolis, IN (US)

( * ) Notice: Subject to any disclaimer, the term of this patent is extended or adjusted under 35 U.S.C. 154(b) by 163 days.

(21) Appl. No.: 16/791,391

(22) Filed: Feb. 14, 2020

(65) Prior Publication Data
US 2021/0252743 A1 Aug. 19, 2021

(51) Int. Cl.
| | |
|---|---|
| *B29C 65/56* | (2006.01) |
| *F16L 47/04* | (2006.01) |
| *F16L 47/20* | (2006.01) |
| *F16L 33/00* | (2006.01) |
| *B29C 35/02* | (2006.01) |
| *B29B 11/12* | (2006.01) |
| *B29C 70/68* | (2006.01) |
| *B29L 23/00* | (2006.01) |
| *B29K 623/00* | (2006.01) |
| *B29C 70/76* | (2006.01) |
| *B29C 57/00* | (2006.01) |
| *B30B 15/02* | (2006.01) |
| *B30B 7/02* | (2006.01) |

(52) U.S. Cl.
CPC ............. *B29C 65/56* (2013.01); *B29C 35/02* (2013.01); *B29C 65/565* (2013.01); *F16L 33/006* (2013.01); *F16L 47/04* (2013.01); *F16L 47/20* (2013.01); *B29B 11/12* (2013.01); *B29C 57/00* (2013.01); *B29C 70/68* (2013.01); *B29C 70/683* (2013.01); *B29C 70/766* (2013.01); *B29K 2623/06* (2013.01); *B29L 2023/22* (2013.01); *B30B 7/02* (2013.01); *B30B 15/02* (2013.01)

(58) Field of Classification Search
CPC ....... B29C 70/766; B29C 57/00; B29C 43/36; B29C 33/301; B29C 65/565
See application file for complete search history.

(56) References Cited

U.S. PATENT DOCUMENTS

| | | | | | |
|---|---|---|---|---|---|
| 2,686,337 | A | * | 8/1954 | Kaufman | B29C 66/723 264/449 |
| 3,280,423 | A | * | 10/1966 | Voumard | B29C 33/0033 425/86 |
| 3,599,287 | A | * | 8/1971 | Buck | B29C 57/00 425/393 |
| 4,052,990 | A | * | 10/1977 | Dodgson | A61M 16/0816 128/207.14 |
| 4,108,589 | A | * | 8/1978 | Bunch | B21D 19/046 269/228 |
| 4,152,817 | A | * | 5/1979 | Cotten | B29C 57/00 285/148.18 |

(Continued)

*Primary Examiner* — Benjamin A Schiffman

(74) *Attorney, Agent, or Firm* — Bose McKinney & Evans LLP

(57) ABSTRACT

A tube assembly including a cross-linked polyethylene tube having a radial projection and a coupler, and a method for forming the tube assembly. A forming assembly is configured to dispose the radial projection of the cross-linked polyethylene tube through the coupler after the completion of the cross-linking process.

29 Claims, 9 Drawing Sheets

(56) References Cited

U.S. PATENT DOCUMENTS

| | | | | |
|---|---|---|---|---|
| 4,316,870 A | * | 2/1982 | Rowley | B29B 13/025 264/296 |
| 4,383,966 A | * | 5/1983 | Svetlik | B29C 57/00 264/296 |
| 4,525,136 A | * | 6/1985 | Rowley | B29C 57/00 425/384 |
| 4,783,303 A | | 11/1988 | Imgram | |
| 5,078,433 A | * | 1/1992 | Morse | A61M 25/0014 285/281 |
| 5,439,259 A | * | 8/1995 | Taga | B29C 57/00 285/334.5 |
| 5,683,647 A | * | 11/1997 | Kawasaki | B29C 33/0044 264/259 |
| 5,861,200 A | * | 1/1999 | Rowley | B29C 57/04 428/36.9 |
| 5,895,695 A | * | 4/1999 | Rowley | B29C 45/14598 428/36.9 |
| 5,935,620 A | * | 8/1999 | Baudin | B29C 33/301 425/522 |
| 6,070,916 A | | 6/2000 | Rowley | |
| 6,270,125 B1 | | 8/2001 | Rowley | |
| 6,287,501 B1 | | 9/2001 | Rowley | |
| 6,857,670 B2 | * | 2/2005 | Fritze | B29C 57/00 285/21.1 |
| 6,860,524 B1 | * | 3/2005 | Rowley | B29C 57/00 285/148.19 |
| 7,766,043 B2 | | 8/2010 | Thomas et al. | |
| 8,146,955 B2 | | 4/2012 | Thomas et al. | |
| 8,329,088 B1 | | 12/2012 | Rowley et al. | |
| 8,844,111 B1 | | 9/2014 | Yunk et al. | |
| 9,096,002 B2 | | 8/2015 | Seman et al. | |
| 9,163,759 B2 | | 10/2015 | Thomas et al. | |
| 9,403,327 B2 | | 8/2016 | Rowley | |
| 9,440,395 B1 | | 9/2016 | Rowley et al. | |
| 10,093,063 B2 | | 10/2018 | Olinger et al. | |
| 2001/0035038 A1 | | 11/2001 | Ose | |
| 2004/0026819 A1 | * | 2/2004 | Lum | B29C 61/006 264/230 |
| 2009/0302602 A1 | | 12/2009 | Thomas | |
| 2011/0297248 A1 | | 12/2011 | Nelson et al. | |
| 2013/0113210 A1 | | 5/2013 | Lund | |
| 2018/0128409 A1 | | 5/2018 | Twaroski et al. | |
| 2018/0305930 A1 | * | 10/2018 | Martin | E04C 5/085 |
| 2019/0085993 A1 | | 3/2019 | Nelson et al. | |

\* cited by examiner

CROSS-LINKED PEX FORMING AFTER ASSEMBLY

BACKGROUND AND SUMMARY

The present disclosure relates to a tube assembly including a cross-linked polyethylene tube and a coupler, and a method for forming the tube assembly. The present disclosure further relates to a forming assembly configured to insert a cross-linked polyethylene tube through a coupler after completion of the cross-linking process.

Cross-linked polyethylene can be used in a variety of applications, including pipe systems and cable insulation. Cross-linked polyethylene is often used as an alternative for polyvinyl chloride, chlorinated polyvinyl chloride, and metal in pipe systems, for example. Cross-linked polyethylene is a favorable material due to characteristics such as thermal resistance, cracking resistance, scratch resistance, and impact strength. In a typical method, a pipe, cable, or other article is formed from a polyethylene compound, such as high-density polyethylene or low-density polyethylene. Then, the article undergoes a cross-linking process, such as peroxide cross-linking, silane cross-linking, irradiation cross-linking, or azo cross-linking.

In tubing or pipe applications, a coupler or fastener such as a coupling nut may be disposed on the pipe or tubing to facilitate fluid coupling of the pipe or tubing to another component. In such an illustrative embodiment, the coupler must be disposed on the pipe or tubing before the cross-linking process. Otherwise the coupler must be moved to ensure the entire pipe or tubing has been cross-linked. Such a process may lead to non-uniform cross-linking, resulting in non-uniform properties of the pipe or tubing. This manufacturing process may additionally be inconvenient and inefficient.

According to an illustrative embodiment of the present disclosure, a forming assembly includes a press block cooperating with a forming block. The press block includes a main body and an extension extending from the main body, the extension and the main body defining a holder recess configured to receive at least a portion of a tube. The forming block includes a body defining a first recess longitudinally aligned with the extension of the press block, the extension configured to position at least a portion of the tube within the first recess, and a second recess configured to receive a coupler.

According to another illustrative embodiment of the present disclosure, a forming assembly includes a press block cooperating with a forming block. The press block includes an extension extending from a main body. The main body and the extension defines a recess configured to receive at least a portion of a tube formed of cross-linked polyethylene, the extension including an end surface. The tube includes an anchor fitting overmolded to an end of the tube so that when the tube is received within the recess of the press block, the anchor fitting extends from the end surface of the extension. The forming block includes a first conical recess configured to receive at least a portion of the anchor fitting and the extension, and a second recess configured to receive a coupling nut.

According to a further illustrative embodiment of the present disclosure, a method for forming a tube includes providing a press block having a holder recess defined by a main body of the press block and an extension of the press block, and positioning a tube having a radial projection within the holder recess of the press block. The method further includes providing a forming block having a first recess and a second recess, positioning a coupler in the second recess of the forming block, and aligning the press block with the forming block. The method further includes moving at least one of the press block and the forming block relative to the other of the forming block and the press block so that the radial projection of the tube is pressed through the first recess of the forming block and into the second recess of the forming block, compressing the radial projection of the tube by the first recess of the forming block, and inserting the tube through the coupler so that the radial projection of the tube passes through the coupler.

According to another illustrative embodiment of the present disclosure, a method for forming a tube includes providing a tube of polyethylene, cross-linking the polyethylene, and coupling an anchor fitting to an end of the tube. The method further includes providing a press block having a holder recess defined by a main body of the press block and an extension of the press block, and providing a forming block having a first recess and a second recess. The method also includes positioning the tube within the holder recess of a press block, so that the anchor fitting extends from the extension of the press block, positioning a coupling nut in the second recess of the forming block, and aligning the press block with the forming block. The method further includes moving at least one of the press block and the forming block closer to the other of the forming block and the press block so that the extension presses the anchor fitting through the first recess of the forming block and into the second recess of the forming block, compressing the anchor fitting of the tube by the first recess of the forming block, and inserting the tube through the coupling nut so that the anchor fitting of the tube passes through the coupling nut.

Additional features and advantages of the present disclosure will become apparent to those skilled in the art upon consideration of the following detailed description of the illustrative embodiments exemplifying the disclosure as presently perceived.

BRIEF DESCRIPTION OF THE DRAWINGS

The detailed description of the drawings particularly refers to the accompanying figures in which.

Figure 1:
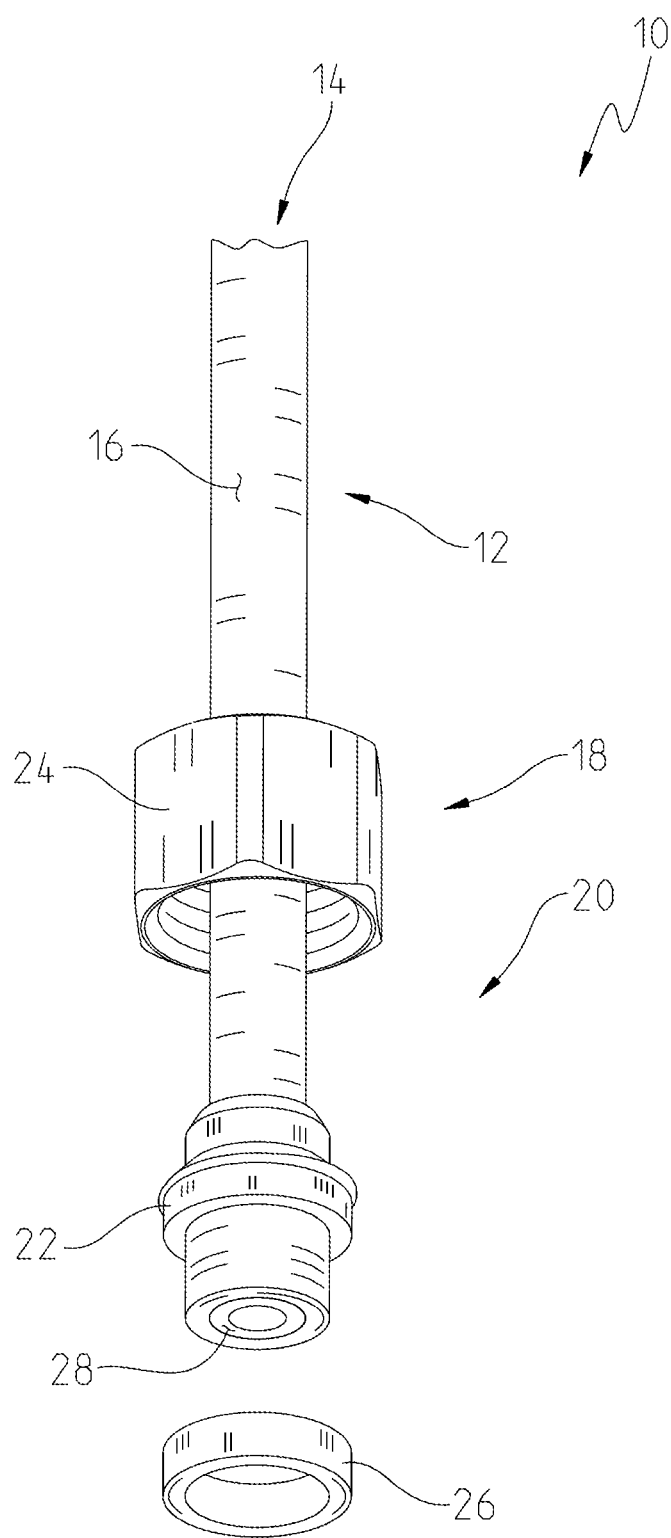
FIG. 1 is a perspective view of an end of a cross-linked tube assembly according to an illustrative embodiment of the present disclosure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION

The embodiments of the disclosure described herein are not intended to be exhaustive or to limit the disclosure to the precise forms disclosed. Rather, the embodiments described herein enable one skilled in the art to practice the disclosure.

Referring initially to FIG. 1, an illustrative tube assembly 10 manufactured according to the method of the present disclosure is shown as including a fluid tube 12 having a fluid passageway 14. The fluid tube 12 includes an outer surface 16 and an end 18 supporting a fluid coupler 20 including a fitting 22 and a fastener, such as a coupling nut 24. A sealing member, such as an annular gasket 26, may be supported on the end 18 portion of the tube 12. As further detailed herein, the fitting 22 may be overmolded to the end portion 18 of the tube 12 to define a planar end surface 28.

Figure 2:
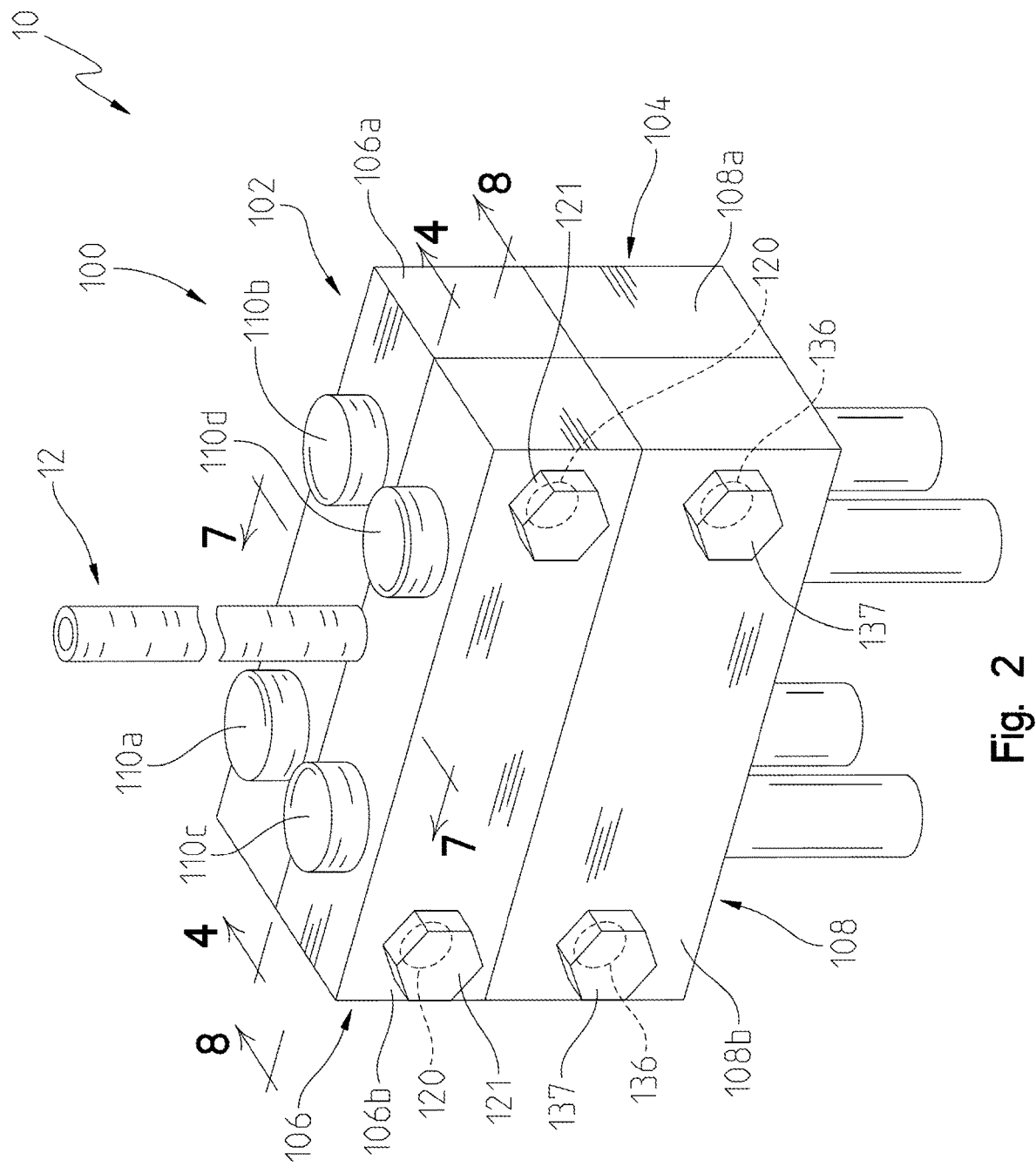
FIG. 2 is a perspective view of an illustrative forming assembly of the present disclosure, wherein the forming assembly includes a press block, a forming block, and a plurality of guide pins to be selectively received within apertures of each of the press block and the forming block so that the press block and the forming block align in the manner desired.

Referring now to FIG. 2, a forming assembly 100 is disclosed. The forming assembly 100 includes a press block 102 cooperating with a forming block 104. The press block 102 illustrative includes a first press member 106a and a second press member 106b. The forming block 104 illustratively includes a first forming member 108a and a second forming member 108b. Illustratively, four guide pins 110a, 110b, 110c and 110d extend between the press block 102 and the forming block 104. The tube 12 may be removably disposed within the forming assembly 100 as detailed further herein.

In an illustrative embodiment, the tube 12 is comprised of cross-linked polyethylene ("PEX"). For example, in manufacturing, the tube 12 is formed out of a polyethylene, such as high-density polyethylene. In some embodiments, the tube 12 may be formed from low-density polyethylene. The tube 12 may then undergo the cross-linking process by a number of cross-linking methods, including peroxide cross-linking, silane cross-linking, irradiation cross-linking, and azo cross-linking. During the cross-linking process, cross-linked bonds are formed within the polymer structure and can be completed to a varying degree depending on the desire of the manufacturer and the purpose of the cross-linked tube.

Figure 3:
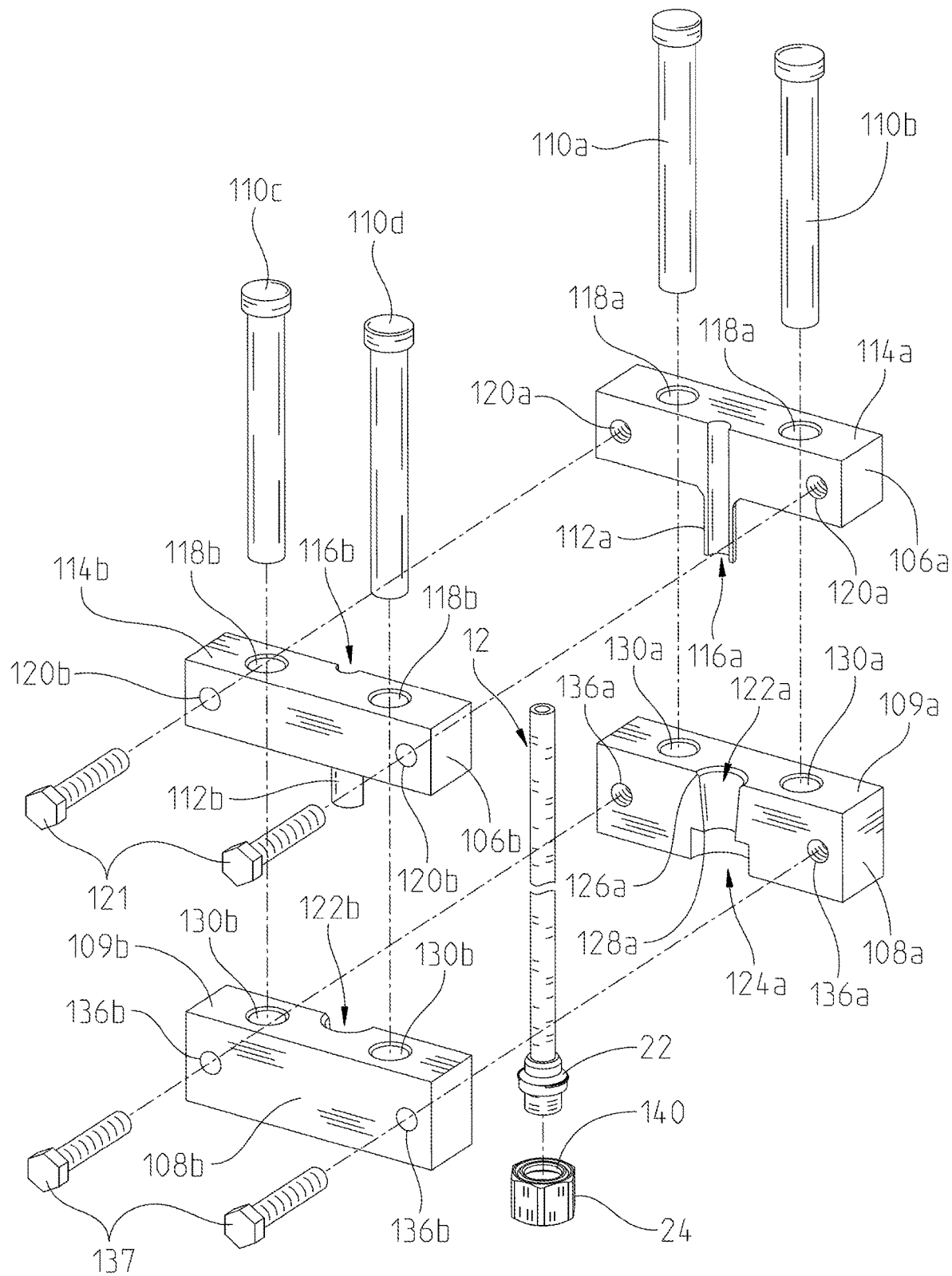
FIG. 3 is an exploded view of the illustrative forming assembly of FIG. 1, further illustrating the several components of the forming assembly configured to compress a tube for disposal of the tube through a fastener.

Now referring to FIG. 3, an exploded view of the forming assembly 100 is illustrated. As shown, the first press member 106a includes an extension 112a extending from a main body 114a of the first press member 106a. The extension 112a and the body 114a together form a recess 116a configured to at least partially receive the tube 12. The first press member 106a further includes a pair of apertures 118a, each of the apertures 118a configured to receive a guide pin 110, for example, guide pins 110a and 110b. Similarly, the second press member 106b includes an extension 112b extending from a main body 114b of the second press member 106b. The extension 112b and the body 114b together form a recess 116b configured to at least partially receive the tube 12. The second press member 106b further includes a pair of apertures 118b, each of the apertures 118b configured to receive a guide pin 110, for example, guide pins 110c and 110d.

In the illustrative embodiment, the first press member 106a and the second press member 106b are structured so that the recess 116a of the first press member 106a and the recess 116b of the second press member 106b selectively cooperate to fully receive the tube 12. In other embodiments, the first press member 106a and the second press member 106b may be structured so that the recess 116a of the first press member 106a and the recess 116b of the second press member 106b selectively cooperate to define a recess or passageway 116 for receiving a substantial portion of the tube 12. In yet other embodiments, the first press member 106a and the second press member 106b may be structured so that the recess 116a of the first press member 106a and the recess 116b of the second press member 106b selectively cooperate to receive a less-than-substantial portion of the tube 12. Furthermore, the extension 112a of the first press member 106a and the extension 112b of the second press member 106b selectively cooperate to form a full extension 112.

The first press member 106a may include fastener apertures 120a, and the second press member 106b may include fastener apertures 120b configured to selectively cooperate with the fastener apertures 120a to form fastener apertures 120, each fastener aperture 120 configured to receive a fastener 121 to secure the first press member 106a to the second press member 106b, if desired, to form a combined press block 102. It is appreciated that in manufacturing, first press member 106a and second press member 106b can be manufactured as a single component press block 102.

Still referring to FIG. 3, the first forming member 108a includes a main body 109a having a first recess 122a and a second recess 124a in communication with the first recess 122a. The first recess 122a is illustratively tapered or conical in shape, wherein a first opening 126a of the recess is sized and shaped to receive the extension 112a of the press member, and a second opening 128a of the first recess 122a is in communication with the second recess 124a and is smaller in size compared to the first opening 126a. The second recess 124a is illustratively sized and shaped to at least partially receive a fastener, such as coupling nut 32. In other illustrative embodiments, the second recess 124a is sized and shaped to at least partially receive another component through or into which a user may want to position the tube 12. For example, other components may include a mounting shank, a spout, or various nut anchors, among other components as known to one skilled in the art.

The first forming member 108a further includes a pair of apertures 130a, each of the apertures 130a configured to receive a guide pin 110, for example, guide pins 110a and 110b, to align the first forming member 108a with the first press member 106a during use. As illustrated, guide pins 110a and 110b have a longitudinal length long enough to allow the guide pins 110a and 110b to be received in both the apertures 118a of the press member 106a and the apertures 130a of the forming member 108a while maintaining a distance between the press member 106a and the forming member 108a as described further herein.

Similarly, the second forming member 108b includes a main body 109b having a first recess 122b and a second recess 124b in communication with the first recess 122b. The first recess 122b is illustratively tapered or conical in shape, wherein a first opening 126b of the recess is sized and shaped to receive the extension 112b of the press member 104b and a second opening 128b of the first recess 122b is in communication with the second recess 124b and is smaller in size compared to the first opening 126b. The second recess 124b is illustratively sized and shaped to at least partially receive a fastener, such as nut 32. In other embodiments, the second recess 124b is sized and shaped to at least partially receive another component through or into which a user may want to position the tube 12.

The second forming member 108b further includes a pair of apertures 130b, each of the apertures 130b configured to receive a guide pin 110, for example, guide pins 110c and 110d, to align the second forming member 108b with the second press member 106b during use. As illustrated, guide pins 110c and 110d have a longitudinal length long enough to allow the guide pins 110c and 110d to be received in both the apertures 112b of the press member 106b and the apertures 130b of the press member 106b while maintaining a distance between the press member 106b and the press member 106b as described further herein.

In the illustrative embodiment, the first forming member 108a and the second forming member 108b are structured so that the first recess 122a of the first forming member 108a and the first recess 122b of the second forming member 108b selectively cooperate to fully receive the full extension 112 formed by the first extension 112a of the first press member 106a and the second extension 112b of the second press member 106b. In other embodiments, the first forming member 108a and the second forming member 108b may be structured so that the first recess 122a of the first forming member 108a and the first recess 122b of the second forming member 108b selectively cooperate to receive a substantial portion of the full extension. In yet other embodiments, the first forming member 108a and the second forming member 108b may be structured so that the first recess 122a of the first forming member 108a and the first recess 122b of the second forming member 108b selectively cooperate to receive a less-than-substantial portion of the full extension 112.

The first forming member 108a and the second forming member 108b may be structured so that the second recess 124a of the first forming member 108a and the second recess 124b of the second forming member 108b selectively cooperate to fully receive the coupling nut 32. In other embodiments, the first forming member 108a and the second forming member 108b may be structured so that the second recess 124a of the first forming member 108a and the second recess 124b of the second forming member 108b selectively cooperate to receive a substantial portion of the nut 32. In yet other embodiments, the first forming member 108a and the second forming member 108b may be structured so that the second recess 124a of the first forming member 108a and the second recess 124b of the second forming member 108b selectively cooperate to receive a less-than-substantial portion of the nut 32.

The first forming member 108a may include fastener apertures 136a, and the second forming member 108b may include fastener apertures 136b configured to selectively cooperate with the fastener apertures 136a to form fastener apertures 136. Each fastener aperture 136 is configured to receive a fastener 137 to secure the first forming member 108a to the second forming member 108b, if desired, to form a combined forming block 104. It is appreciated that in manufacturing, the first forming member 108a and the second forming member 108b can be manufactured as a single component forming block 104.

As shown in FIG. 3, the tube 12 may be coupled to anchor fitting 22. In an illustrative embodiment, the anchor fitting 22 may be fixedly coupled to the tube 12 through, for example, overmolding. In other embodiments, the anchor fitting 22 may be fixedly coupled to the tube 12 via other methods. In yet other embodiments, the anchor fitting 22 may be semi-fixedly coupled to the tube 12, or may otherwise be removably coupled to the tube 12. The anchor fitting 22 may be comprised of the same material as tube 12 or a different material. The anchor fitting 22 includes an outer diameter that is greater than the diameter of a through-hole 140 of the nut 32. For reference, the term "diameter" is not meant to require a circular cross-section and is instead to be understood broadly to reference a maximum transverse cross-sectional dimension of referenced component. In yet other embodiments, the tube 12 may not include an anchor fitting 22.

Figure 4:
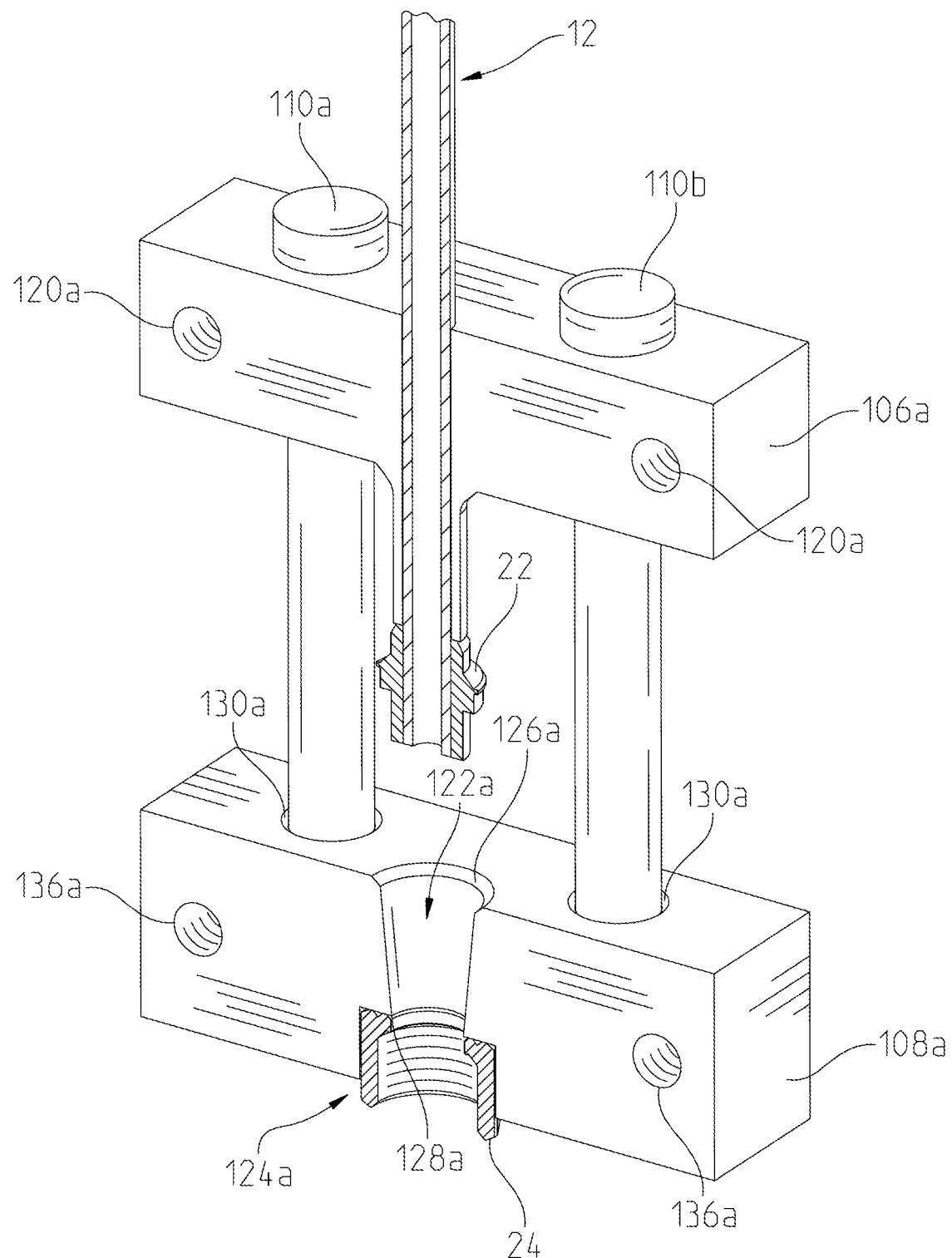
FIG. 4 is a cross-sectional view of the illustrative forming assembly of FIG. 1 taken along line 4-4 of FIG. 1, wherein the guide pins are received within the apertures of the press block and the forming block so that the press block is spaced apart from the forming block.
Figure 5:
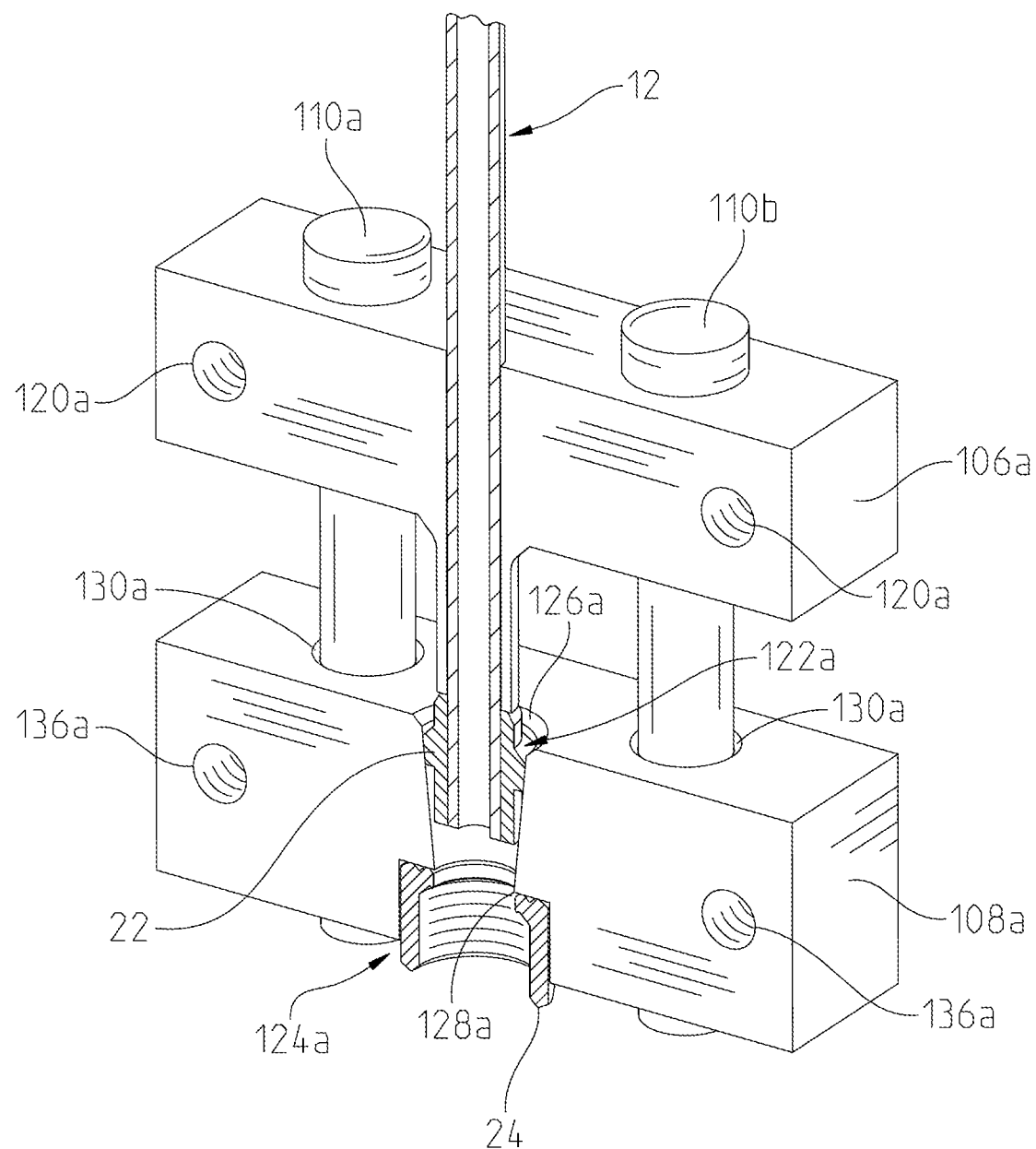
FIG. 5. is another cross-sectional view of the illustrative forming assembly of FIG. 4, wherein the press block and the forming block are arranged so that a tube is received in both the press block and the forming block.
Figure 6:
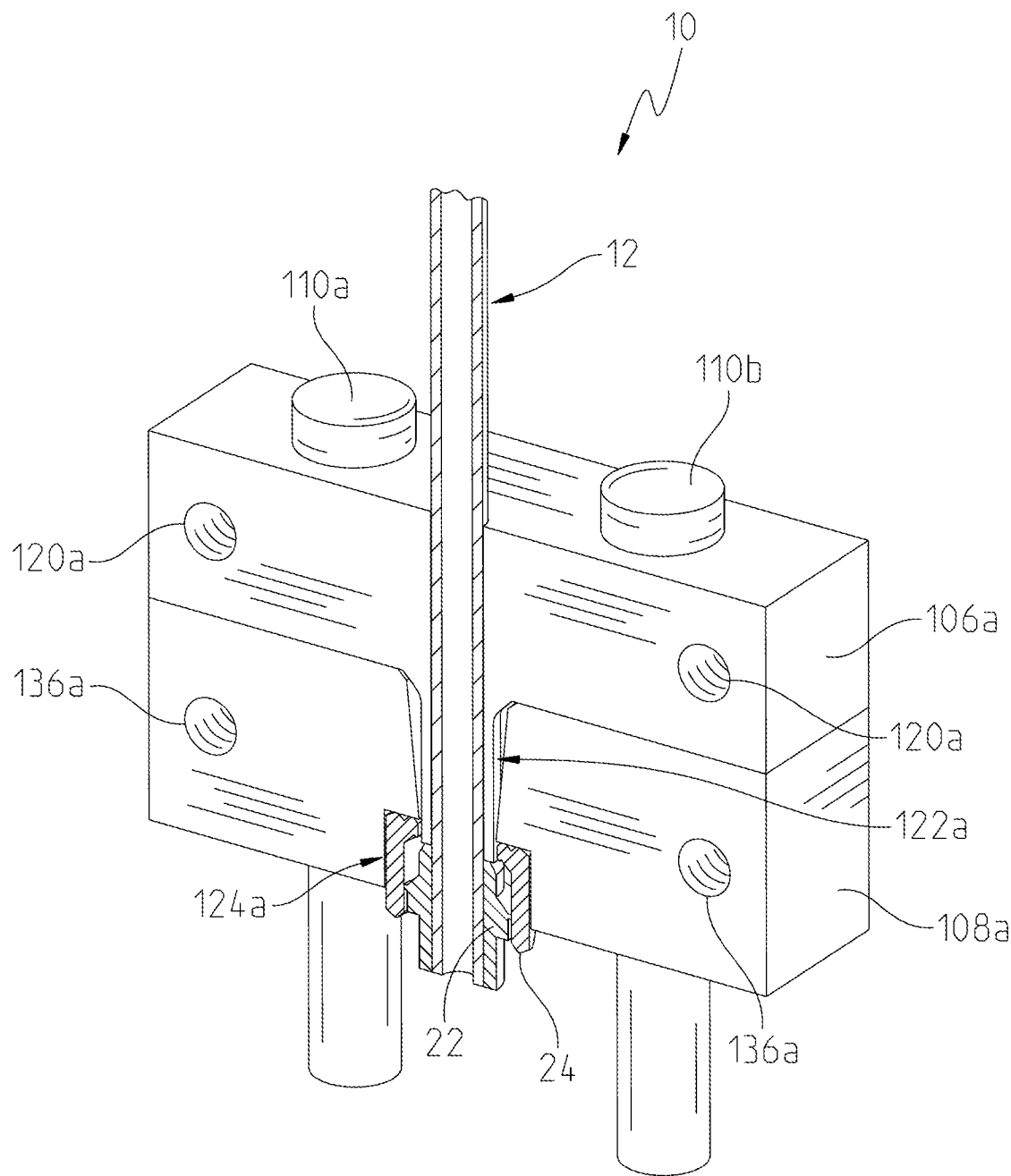
FIG. 6 is yet another cross-sectional view of the illustrative forming assembly of FIG. 4, wherein the press block and the forming block are pressed together so that the tube is compressed and disposed through a nut received within the forming block.

FIGS. 4-6 illustrate a process of positioning the tube 12 and anchor fitting 20 through the nut 32 using the forming assembly 100. For example, referring initially to FIG. 4, the tube 12 is positioned within the recess 116 formed by the main body 114 and the extension 112 of the press block 102. In an embodiment having separable press member 106a and 106b, the tube 12 may first be positioned in one of either the recess 116a or the recess 116b of the press members 106a or 106b, respectively. The other of the press member 106a or 106b may then cooperate with the press member 106a or 106b which had received the tube 12 so that the tube 12 is sandwiched between the press member 106a and the press member 106b and thereby positioned within both recesses 116a and 116b, wherein the recesses 116a, 116b together form the recess 116. In an embodiment where the press block 102 is manufactured as a single piece, or in an embodiment where the first press member 106a and the second press member 106b are fixedly attached, the tube 12 may be inserted into the recess 116 via the extension 112. In either embodiment, the tube 12 is positioned within the recess 116 so that the anchor fitting 22 extends beyond the extension 112.

A guide pin 110 is received in each of the apertures 118 of the press block 102 and in each of the apertures 130 of the forming block 104 so that the press block 102 and the forming block 104 are properly aligned. In other words, the press block 102 and the forming block 104 are aligned so that the extension 112 can be properly and easily received within the first recess 122 of the forming block 104. As noted above, although the guide pins 110 are received in both the apertures 130 of the forming block 104 and the apertures 118 of the press block 102, the forming block 104 and the press block 102 are separated so that the anchor fitting 22 is suspended from the press block 102 within a space 114 between the press block 102 and the forming block 104.

Now referring to FIG. 4, as the press block 102 and the forming block 104 move toward each other along the guide pins 106, the anchor fitting 22 is inserted into the first recess 122 of the press block 102 via the first opening 126, which is sized and shaped to receive the anchor fitting 120 and the extension 112 as described above. As the press block 102 and the forming block 104 continue to move toward each other along the guide pins 110, the conical shape of the first recess 122 compresses the anchor fitting 120 and the tube 12 via the extension 112 so that the anchor fitting 22 and the tube 12 are sized and shaped to be disposed through the through-hole 140 of the nut 32. In other words, the second opening 128a of the first recess 122a is equal to or smaller than the opening of the through-hole 140.

Figure 7:
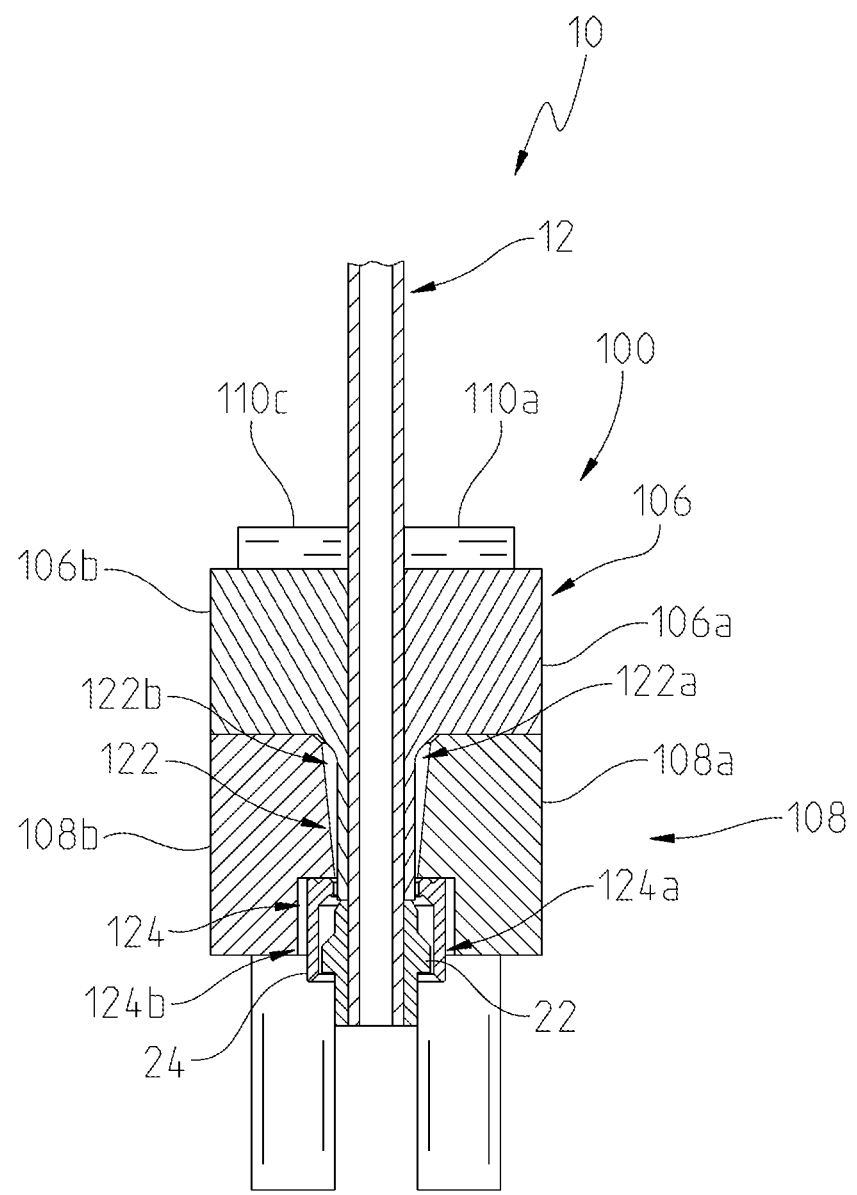
FIG. 7 is a cross-sectional view of the illustrative forming assembly of FIG. 1 taken along line 7-7 of FIG. 1, wherein the press block and the forming block are pressed together so that the tube is compressed and disposed through the nut received within the forming block.
Figure 8:
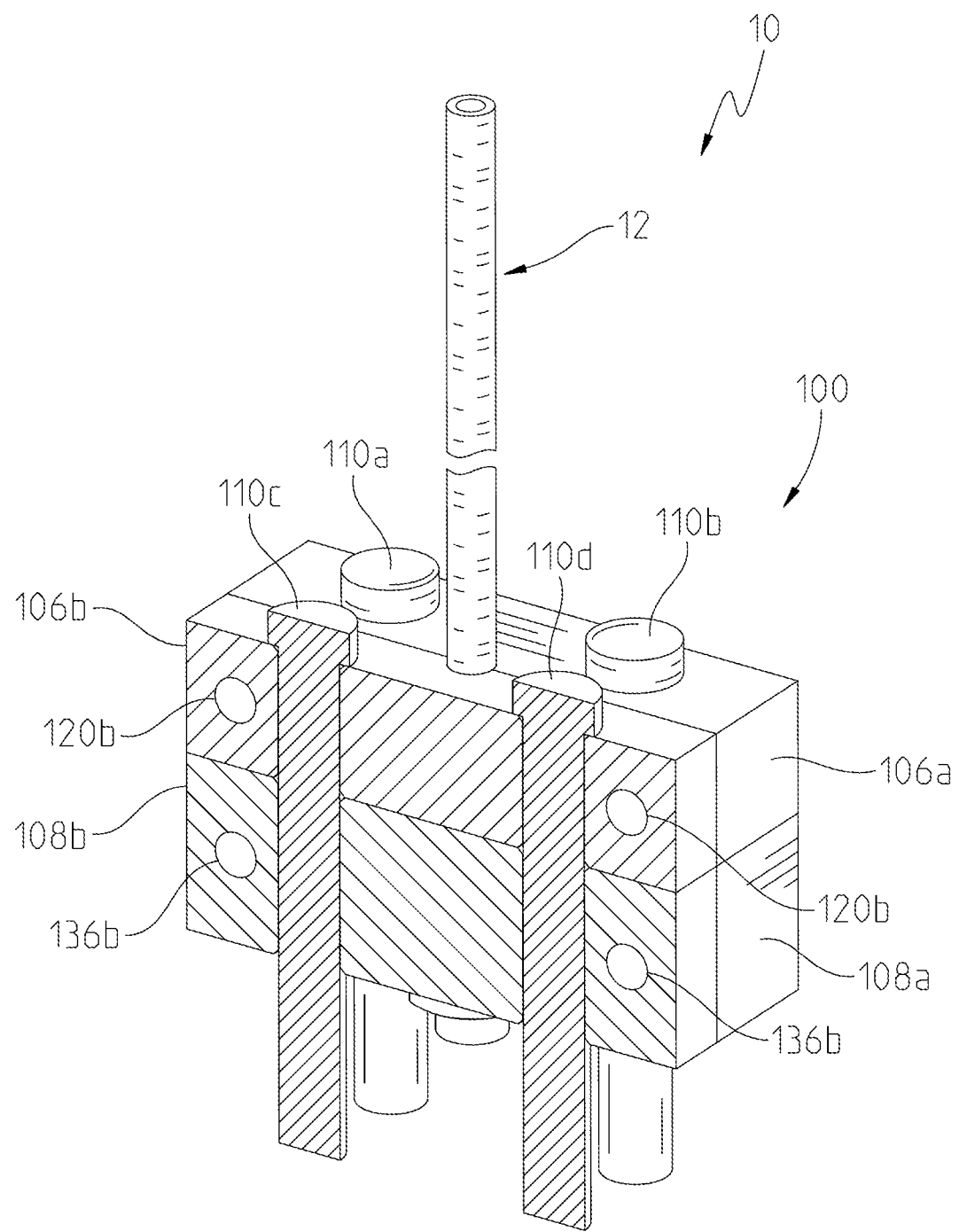
FIG. 8 is a cross-sectional view of the illustrative forming assembly of FIG. 1 taken along line 8-8 of FIG. 1, wherein the press block and the forming block are pressed together so that the tube is compressed and disposed through the nut received within the forming block.

For example, referring to FIG. 6, the conical shape of the first recess 122 has compressed the anchor fitting 22 and the tube 12 via the extension 112 via a radial force exerted by the conical shape of the first recess 122 in combination with the force of the movement of the press block 102 and the formation block 104 relative to each other so that the nut 32 is disposed on the tube 12. With removal of the tube 12 from the press assembly 100, the tube 12 and the anchor fitting 22 return to their normal size so that the nut 32 is trapped by the anchor fitting 22 in such a way that the nut 32 may move along the tube 12 but cannot be removed from the tube 12. FIGS. 6-7 further illustrates the combination of the first press member 106a, the second press member 106b, the first forming member 108a, and the second forming member 108b assembled with guide pins 106 so that the anchor fitting 112 and the tube 12 is disposed through the nut 32 via the extension 112 and the conical-shaped first recess 122.

As mentioned above, it may be appreciated that the tube 12 does not include an anchor fitting 22. In such an embodiment, the press assembly 100 may still be used to compress the tube 12 via the extension 112 to dispose the tube 12 through the nut 32.

By using the press assembly 100, the tube 12 may undergo the cross-linking process before the tube 12 is disposed within the through-hole of the nut 32. For example, in a conventional assembly, a tube 12 may be manufactured of a polyethylene as described above. Because polyethylene is much more pliable before the cross-linking process, a coupling nut 32 is disposed on the tube 12, which may be followed by overmolding an anchor fitting on the end of the tube 12. The tube 12 then undergoes the cross-linking process, which requires the user to move the coupling nut 24 relative to various areas of the tube 12 so that the entirety of the tube 12 undergoes the cross-linking process. However, such a method may result in non-uniform cross-linking of the tube 12 and is also inconvenient for the user.

Figure 9:
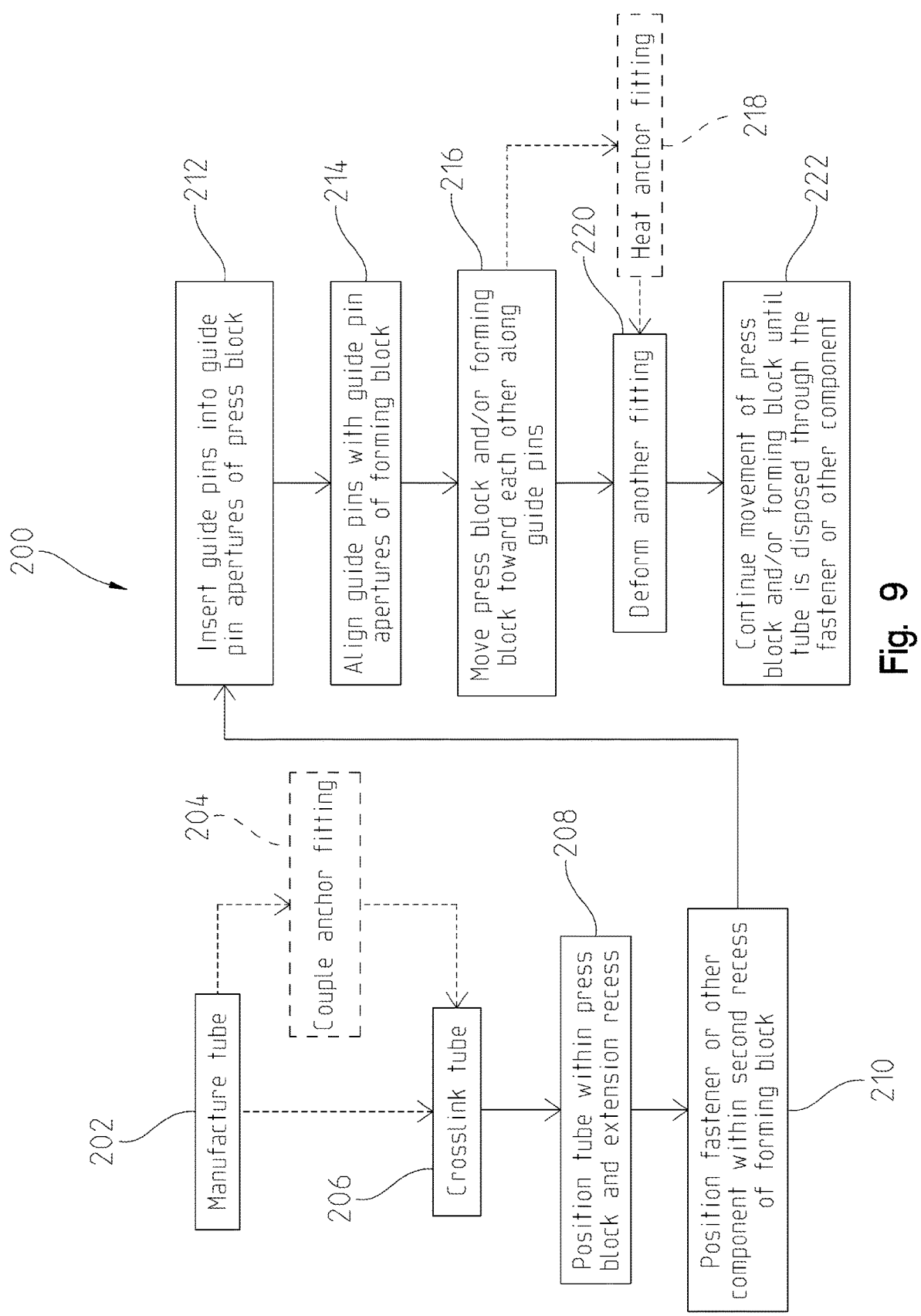
FIG. 9 is a flowchart illustrating a method for utilizing the illustrative forming assembly of FIG. 1, including a method for disposing a tube through a coupling nut or other fastener using the illustrative press assembly.

Now referring to FIG. 9, a method 200 for utilizing the press assembly 100 as disclosed in FIGS. 2-8 is disclosed. For example, at method block 202, hollow cylindrical tube 12 is manufactured using conventional methods. Illustratively, the tube 12 is comprised of a polyethylene, such as high-density polyethylene. In some embodiments, the tube 12 may be comprised of low-density polyethylene. After formation of the tube 12, at method block 204, an anchor fitting 22 may be coupled to at least one end of the tube 12 via, for example, overmolding. The anchor fitting 22 may be coupled to the tube 12 via other methods, may be semi-fixedly coupled to the tube 12, or may be removably coupled to the tube 12. In some embodiments, the anchor fitting 22 may not be overmolded to the tube 12.

The tube 12 then undergoes a cross-linking process at method block 206. Any conventional method of cross-linking may be used, for example, peroxide cross-linking, silane cross-linking, irradiation cross-linking, and azo cross-linking. In the illustrative embodiment, irradiation cross-linking is used via an electron beam (e-beam), for example. During the cross-linking process, cross-linked bonds are formed within the polymer structure and can be completed to a varying degree depending on the desire of the manufacturer and the purpose of the cross-linked tube 12.

Now referring to method block 208 of FIG. 9, the tube 12 is positioned within the recess 116 formed by the press block 102 and the extension 112. As mentioned above, the tube 12 may be positioned within the press block recess 116 via different methods. For example, in an embodiment having separable press block portions, the tube 12 may first be positioned in the recess 116a of first press member 106a so that second press member 106b may cooperate with the first press member 106a to sandwich the tube 12 between the first press member 106a and the second press member 106b. In an embodiment where the press block 102 is manufactured as a single piece, or in an embodiment where a first press member 106a and a second press member 106b are fixedly attached, the tube 12 may be inserted into the recess 116 via the extension 112. In either embodiment, the tube 12 is positioned within the recess 116 so that the anchor fitting 22 (if present) extends beyond the extension 112.

At method block 210, a fastener, such as anchor or coupling nut 24, or other component is positioned within the second recess 124 of the forming block 104. As mentioned above, the fastener may include a mounting shank, anchor nut, spout, or any other component as recognized by one skilled in the art. At method block 212, guide pins 110 are inserted into the guide pin apertures 118 of the press block 102. It is recognized that the steps illustrated by method blocks 208, 210, and 212 may occur in any order as desired by a user.

At some time after the guide pins 110 are inserted into the guide pin apertures 118 of the press block 102 at method block 212, the guide pins 110 are aligned with the guide pin apertures 130 of the forming block 104 as shown at method block 214 so that the guide pin apertures 130 of the forming block 104 may receive the guide pins 110. The press block 102 and/or the forming block 104 is then moved toward the other of the forming block 104 and the press block 102 along the guide pins 110 at method block 216 so that the extension 112 of the press block 102 is received within the first, conical-shaped recess 122 of the forming block 104. This movement continues until the anchor fitting 22 and/or tube 12 is disposed through the coupling nut 24 or other component received within the second recess 124 of the forming block 104 as indicated at method block 218. By such a method, a cross-linked tube and/or anchor fitting may be disposed through a coupling nut or other component after the cross-linking process occurs to facilitate uniform and convenient cross-linking of the tube.

As used in this patent application, the terminology "for example," "for instance," "like," "such as," "comprising," "having," "including," and the like, when used with a listing of one or more elements, is open-ended, meaning that the listing does not exclude additional elements. Likewise, when preceding an element, the articles "a," "an," "the," and "said" mean that there are one or more of the elements. Moreover, directional words such as front, rear, top, bottom, upper, lower, radial, circumferential, axial, lateral, longitudinal, vertical, horizontal, transverse, and/or the like are employed by way of example and not limitation. As used herein, the term "may" is an expedient merely to indicate optionality, for instance, of an element, feature, or other thing, and cannot be reasonably construed as rendering indefinite any disclosure herein. Other terms are to be interpreted and construed in the broadest reasonable manner in accordance with their ordinary and customary meaning in the art, unless the terms are used in a context that requires a different interpretation.

Finally, the present disclosure is not a definitive presentation of an invention claimed in this patent application but is merely a presentation of examples of illustrative embodiments of the claimed invention. More specifically, the present disclosure sets forth one or more examples that are not limitations on the scope of the claimed invention or on terminology used in the accompanying claims, except where terminology is expressly defined herein. And although the present disclosure sets forth a limited number of examples, many other examples may exist now or are yet to be discovered and, thus, it is neither intended nor possible to disclose all possible manifestations of the claimed invention. In fact, various equivalents will become apparent to artisans of ordinary skill in view of the present disclosure and will fall within the spirit and broad scope of the accompanying claims. Features of various implementing embodiments may be combined to form further embodiments of the invention. Therefore, the claimed invention is not limited to the particular examples of illustrative embodiments disclosed herein but, instead, is defined by the accompanying claims.

What is claimed is:

1. A forming assembly comprising:
a press block including a main body and an extension extending from the main body, the extension and the main body defining a holder recess configured to receive at least a portion of a tube; and
a forming block cooperating with the press block, the forming block including a body defining a first recess tapering from a first opening proximate the press block to a second opening spaced distally from the first opening, the first opening being larger than the second opening, the first recess longitudinally aligned with the extension of the press block, the extension configured to position at least a portion of the tube within the first recess, and a second recess configured to receive a coupler.

2. The forming assembly of claim 1, further comprising a guide pin, wherein the press block includes at least one aperture for selectively receiving the guide pin, and the forming block includes at least one aperture for selectively receiving the guide pin so that the press block and the forming block are aligned.

3. The forming assembly of claim 1, wherein the press block includes a first press member and a second press member, the second press member cooperating with the first press member to form the extension and define the holder recess.

4. The forming assembly of claim 3, wherein the first press member includes apertures and the second press member includes apertures corresponding with the apertures of the first press member, the apertures configured to receive a fastener to couple the first press member with the second press member.

5. The forming assembly of claim 1, wherein the forming block includes a first forming member and a second forming member, the second forming member cooperating with the first forming member to define the first recess and the second recess.

6. The forming assembly of claim 5, wherein the first forming member includes apertures and the second forming member includes apertures corresponding with the apertures of the first forming member, the apertures configured to receive a fastener to couple the first forming member with the second forming member.

7. The forming assembly of claim 1, wherein the tube is comprised of cross-linked polyethylene.

8. The forming assembly of claim 1, wherein the extension of the press block includes an end surface, a radial projection is supported by an end of the tube, and the radial projection is configured to be engaged by the end wall of the extension and deformed by the first recess of the forming block.

9. The forming assembly of claim 8, wherein the radial projection comprises an anchor fitting.

10. The forming assembly of claim 9, wherein the anchor fitting is overmolded to the tube.

11. The forming assembly of claim 1, wherein the first opening of the first recess is on a surface of the first forming block and the second opening of the first recess is in communication with the second recess.

12. The forming assembly of claim 11, wherein the first recess of the first forming block is conical in shape.

13. The forming assembly of claim 1, wherein the second opening has a diameter equal to or less than the diameter of a through-hole of the coupler.

14. The forming assembly of claim 13, wherein the coupler is a coupling nut.

15. A forming assembly comprising:
a press block;
a forming block cooperating with the press block;
wherein the press block includes a main body and an extension extending from the main body, the main body and the extension defining a recess configured to receive at least a portion of a tube formed of cross-linked polyethylene, the extension including an end surface, the tube including an anchor fitting overmolded to an end of the tube so that when the tube is received within the recess of the press block, the anchor fitting extends from the end surface of the extension; and
wherein the forming block includes a first conical recess configured to receive at least a portion of the anchor fitting and the extension, and a second recess configured to receive a coupling nut.

16. The forming assembly of claim 15, wherein:
the press block includes a plurality of apertures, each aperture configured to selectively receive a guide pin; and
the forming block includes a plurality of apertures, each aperture corresponding to an aperture of the press block and configured to selectively receive the respective guide pin of the corresponding press block aperture so that the press block and the forming block are aligned.

17. The forming assembly of claim 15, wherein the press block is comprised of a first press member and a second press member.

18. The forming assembly of claim 15, wherein the press block is manufactured as a single piece.

19. The forming assembly of claim 15, wherein the forming block is comprised of a first forming member and a second forming member.

20. The forming assembly of claim 15, wherein the forming block is manufactured as a single piece.

21. The forming assembly of claim 15, wherein the first conical recess of the forming block has a first opening on a surface of the forming block and a second opening in communication with the second recess and the first opening being larger than the second opening, wherein the second opening is equal to or less than the size of a through-hole of the anchor nut.

22. A method for forming a tube, the method comprising:
providing a press block including a holder recess defined by a main body of the press block and an extension of the press block;
positioning a tube having a radial projection within the holder recess of the press block;
providing a forming block including a first recess and a second recess;
positioning a coupler in the second recess of the forming block;
aligning the press block with the forming block;
moving at least one of the press block and the forming block relative to the other of the forming block and the press block so that the radial projection of the tube is pressed through the first recess of the forming block and into the second recess of the forming block;
compressing the radial projection of the tube by the first recess of the forming block; and inserting the tube through the coupler so that the radial projection of the tube passes through the coupler.

23. The method of claim 22, wherein the aligning step includes inserting a guide pin through both of an aperture of the press block and a corresponding aperture of the forming block.

24. The method of claim 22, wherein the tube is comprised of polyethylene.

25. The method of claim 24, further comprising forming the tube of polyethylene and cross-linking the tube before the step of positioning the tube within the recess of the press block.

26. The method of claim 22, further comprising overmolding an anchor fitting on an end of the tube to define the radial protrusion.

27. The method of claim 26, further comprising disposing the anchor fitting through the coupler.

28. The method of claim 27, wherein the coupler comprises a coupling nut.

29. A method for forming a tube, the method comprising:
providing a tube of polyethylene;
cross-linking the polyethylene;
coupling an anchor fitting to an end of the tube;
providing a press block including a holder recess defined by a main body of the press block and an extension of the press block;
providing a forming block including a first recess and a second recess;
positioning the tube within the holder recess of a press block, so that the anchor fitting extends from the extension of the press block;
positioning a coupling nut in the second recess of the forming block;
aligning the press block with the forming block;
moving at least one of the press block and the forming block closer to the other of the forming block and the press block so that the extension presses the anchor fitting through the first recess of the forming block and into the second recess of the forming block;
compressing the anchor fitting of the tube by the first recess of the forming block; and
inserting the tube through the coupling nut so that the anchor fitting of the tube passes through the coupling nut.

* * * * *